United States Patent Office 2,776,994
Patented Jan. 8, 1957

2,776,994

PREPARATION OF A SOLID DIPHENYLAMINE ANTIOXIDANT

John S. B. Wolfe, Akron, and Lewis H. Conklin, Cuyahoga Falls, Ohio, assignors to The B. F. Goodrich Company, New York, N. Y., a corporation of New York No Drawing. Application March 3, 1954,
Serial No. 413,951

7 Claims. (Cl. 260—576)

This invention relates to a method for producing a solid, dry antioxidant useful as an age resistor in rubbery compositions and other organic materials subject to oxidation. In particular, the present invention relates to a method for producing a solid, frangible, dry composition comprising a dialkylated diarylamine, such as dioctyl diphenylamine, which can readily be dry mixed with rubber and other compounding ingredients on a roll mill or in a Banbury mixer and the like.

When compounding rubber with other ingredients on the mill, it generally is preferred to use solids since they are more easily handled. Many of the best antioxidants such as amines, however, are obtained as reaction mixtures in liquid form which are difficult to solidify. Especially is this true of the dialkylated diarylamines such as p,p'-dioctyl diphenylamine which is shown or suggested in U. S. Letters Patent to Craig 2,009,480 and Hollis, 2,530,769 and which will serve to illustrate the problem involved.

Dioctyl diphenylamine is preferably prepared by reacting at least 2 mols, desirably an excess of diisobutylene and/or its isomers with 1 mol of diphenylamine in the presence of a Friedel-Crafts catalyst at elevated temperatures with agitation under pressure. At the end of the reaction, the reaction mixture will usually contain some diisobutylene, diphenylamine and monooctyl diphenylamine in addition to the desired product, the p,p'-dioctyl diphenylamine. The unreacted diphenylamine and diisobutylene can be removed readily by distillation. Depending on the method of introducing the reactants, the mol ratios, and the like, more or less of the above products will be obtained, but, even with the best techniques, the reaction mixture will contain an appreciable amount of monooctyl diphenylamine. While the monooctyl compound can be used with the dioctyl compound, it does not materially improve age resisting properties of the rubber and serves to reduce the freezing or set point of the dioctyl compound. However, for practical purposes, it may remain with the dioctyl compound. Moreover, to conduct the reaction to avoid the formation of any of the monooctyl compound is very exacting and expensive and, accordingly, uneconomical.

The resulting heated reaction mixture from which the diisobutylene readily escapes on being exposed to atmospheric pressure and from which any unreacted diphenylamine has been removed is liquid. It will not solidify even when exposed to temperatures of from 0–5° C. for extended periods of time, that is, for several months. Even seeding of the liquid will not produce a solid within several weeks. Moreover, subsequent removal of a substantial amount of the monooctyl diphenylamine will not materially change the time required for solidification. Hence, such static processes are impractical from a production standpoint.

On the other hand, the reaction mixture can be crystallized from large quantities of methanol or diisobutylene to obtain a solid containing from 80 to 100% dioctyl diphenylamine, any balance being the monooctyl diphenylamine, and having a set point of from 73 to 100° C. However, from 30 to 40% or more of the dioctyl diphenylamine compound remains in the methanol or diisobutylene. Extensive apparatus is required for the recovery of the solvent so that the process is impractical even ignoring the initial cost of solvent. Moreover, after recovery of the solvent, the residual liquid cannot be solidified even though it contains an appreciable amount of dioctyl diphenylamine. Furthermore, these processes are batch type processes and do not lend themselves readily to high production requirements.

Accordingly, it is a primary object of the present invention to provide a method for readily obtaining a solid antioxidant comprising a dialkylated diphenylamine.

It is another object of this invention to provide a method for continuously treating a liquid reaction mixture containing a dioctyl diphenylamine to obtain a solid, frangible material.

A further object is to provide a method for producing an antioxidant comprising p,p'-dioctyl diphenylamine in a solid, frangible, dry form.

These and other objects and advantages of the present invention will become more apparent to those skilled in the art from the following detailed description and examples.

It has now been discovered according to the present invention that the difficulties alluded to hereinabove can be readily overcome by cooling with agitation the alkylated diarylamine liquid reaction mixture, from which all of the nonreactants and substantially all of the monoalkylated diarylamines have been removed, within the temperature range of from the initial crystallization point of the mixture to the set point of the dialkylated diarylamine to obtain a semisolid and then rapidly cooling said semisolid to a temperature substantially below the initial crystallization point of the mixture to obtain a solid, frangible, dry product. By the method disclosed herein about 55 to 80% of the latent heat of crystallization of the mixture is removed in the first step and the balance in the second step. The resulting material can be readily broken up in a grinding machine to the size desired. It is nongreasy and can be easily handled on a rubber mill with the customary materials employed in compounding rubber.

The amines used to react with the alkenes to form the liquid reaction mixtures from which the solid antioxidants are obtained are diarylamines having the formula:

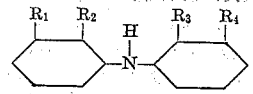

where $R_1$, $R_2$, $R_3$ and $R_4$ are selected from the group consisting of halogen, hydrogen and alkyl having from 1 to 4 carbon atoms. Specific examples of suitable amines are diphenylamine, o-chloro diphenylamine, o-methyl diphenylamine, o,o'-dimethyl diphenylamine, o,m-methyl, propyl diphenylamine, o,o',m,m'-tetramethyl diphenylamine, o,o'-methyl ethyl diphenylamine, o,o'-chloroethyl diphenylamine and the like. The alkenes are selected from the group of alkenes having from 6 to 12 carbon atoms and, preferably, are branch chained alkenes. Suitable alkenes are hexene, 3-methyl-1-hexene, diisobutylene, 2,5-dimethyl hexene, 1-heptene, 2-ethyl-3-methyl-1-butene, 2-dimethyl-4-dimethyl-1-amylene and their isomers and so forth.

The diarylamines and alkenes are easily reacted in mol ratios of 1:2 and, preferably with an excess of the alkene, in the presence of a minor amount (.01–0.1 mol) of a Friedel-Crafts catalyst such as aluminum chloride or zinc chloride at temperatures of from 150 to 250° C. with agitation under pressure, i. e., in an autoclave, and under anhydrous conditions for about an hour. Of course, the temperatures and times can be varied somewhat depending on equipment employed, quantities of reactants and the like.

While an excess of alkene over diarylamine is desired, it is unnecessary to use a large excess such as 3 to 4 mols of alkene to 1 mol of amine nor a large excess of catalyst. Moreover, the amine should be charged to the reactor followed by the catalyst and then the alkene introduced in order to obtain the best yields. Reversing the procedure of introducing the reactants or reacting under refluxing conditions will result in unsatisfactory yields of the dialkylated diarylamine.

At the completion of the reaction the reaction mixture can be cooled slightly and the alkene flashed off. Alternatively it can be distilled and the alkene recovered. The liquid mixture is then permitted to cool below the boiling point of water, about 90° C., and washed with water and 50% caustic soda solution. The mixture is then stripped of any unreacted diarylamine and a substantial portion of the monoalkylated diarylamine. The remaining portion of the reaction mixture or residue is then ready to be solidified. Although the fractionation of the reaction mixture can be conducted until the residue is essentially dialkylated diarylamine, it is only necessary to reduce the content of the monoalkylated diarylamine to from 2 to 20% to obtain a mixture which can be solidified and which will have the desired antioxidant properties.

After stripping, the hot liquid residue can be cooled until it reaches a temperature slightly above the set point of the pure dialkylated diarylamine and then agitated vigorously while being cooled within the temperature range of from its initial crystallization point to the set point of the pure dialkylated diarylamine. The initial crystallization point of the mixture is a few degrees below its set point. Alternatively the hot liquid can be cooled while agitated to a temperature within the above range. Within a short time the liquid will have formed into a slush or semisolid and then is further cooled substantially below its initial crystallization point to obtain a solid, frangible, dry product. The hot stripped liquid residue of the reaction mixture can be pumped continuously through a pipe or tube or other means having heat exchange elements containing a coolant and continuously agitated by means of a stirrer or other means, or through a screw type conveyor having agitating elements and heat exchanging elements, to emerge or be extruded as a semisolid onto conveying or chilling means which operates at a much lower temperature than the agitating means to rapidly cool or chill to form a solid.

During the first cooling step the liquid mixture is agitated vigorously while it is cooled by being in heat exchange relationship with a coolant at a temperature well below the set point of the liquid. For example, when treating a mixture containing 80 to 98% dioctyl diphenylamine, the coolant may have a temperature of 40–50° C. while the set point of the dioctyl diphenylamine mixture is at least about 80° C. and the initial crystallization point is about 76–79° C. With reduction in monooctyl diphenylamine in the mixture to from 2 to 10% by weight, the set point of the mixture will be at least about 85° C. The temperature of the mixture being cooled, however, may be about 85 to 100° C. for after crystallization has been initiated the temperature of the mixture may rise somewhat and remain constant although it can be maintained at about its initial crystallization point if desired. The agitating means keeps the temperature of the mixture constant while continuously withdrawing heat until about 55 to 80% of the latent heat of crystallization has been withdrawn. Unless this heat is removed rapidly and continuously from the mixture, it would fail to crystallize since as fast as the heat of crystallization is given off to produce a solid it would be readsorbed by the system to cause melting. After 55% of this heat has been removed, the semi-solid material is cooled at a lower temperature where the remaining heat of crystallization is removed. This may be accomplished by placing the semisolid in heat exchange relationship with a material having a temperature of about 10–20° C. At this point the material will have cooled sufficiently so that with the rapid reduction in temperature it solidifies without further agitation being required. It would not be desirable to completely cool in the first step to the solid phase since, although this method can be done, it will cause solidification within the apparatus used requiring a shutdown in operations until the solid can be removed and the agitating means freed. A sufficient amount of heat is, accordingly, withdrawn in the first step so that when the semisolid is rapidly cooled in the second step, it will solidify into a hard, frangible, dry material.

The solid, frangible, dry antioxidant produced by the method of the present invention will contain a predominating amount and preferably from 80 to 98% by weight of the dialkylated diarylamine having the formula:

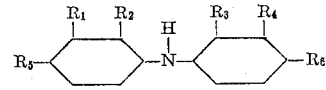

where $R_1$, $R_2$, $R_3$ and $R_4$ are selected from the group consisting of halogen, hydrogen and alkyl having from 1 to 4 carbon atoms and $R_5$ and $R_6$ are alkyl having from 6 to 12 carbon atoms and a minor amount, preferably from 2 to 20% by weight, of a monoalkylated diarylamine having the formula:

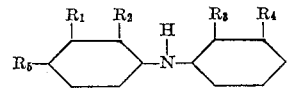

where $R_1$, $R_2$, $R_3$ and $R_4$ are selected from the group consisting of halogen, hydrogen and alkyl having from 1 to 4 carbon atoms and $R_5$ is alkyl having from 6 to 12 carbon atoms. Still more preferred compositions are those in which the dialkylated diarylamine is present in an amount of from 90 to 98%, the balance being the monoalkylated diarylamine. The set point of the solid mixture will be within from about 3 to 20% of the set point of the pure dialkylated diarylamine contained in the mixture.

The following examples will serve to illustrate the invention with more particularity to those skilled in the art:

EXAMPLE I

One mol of diphenylamine was charged to an autoclave and heated to 140° C. using moderate speed agitation with an anchor-type agitator. When the temperature reached 140° C., about 0.0125 mol of aluminum chloride was added. The temperature rose rapidly to 150° C. Then 3 mols of diisobutylene were charged taking a period of about 20 minutes for the addition. The temperature was allowed to rise to approximately 185° C. and the pressure increased to 30–60 p. s. i. g. When the addition of the diisobutylene was complete, agitation was continued an additional 45 minutes. After the charge was cooled to 90° C., it was washed with water and 50% caustic soda solution and distilled. Unreacted diisobutylene was recovered but no unreacted diphenylamine was recoverd. The remainder of the charge was distilled under vacuum (1–10 mm. Hg absolute) at a pot temperature of 250° C. to recover a major proportion of the monooctyl diphenylamine as the distillate. The residue contained about 5% by weight of monooctyl diphenylamine, the balance being the p,p'-dioctyl diphenylamine. The liquid residue was then permitted to cool to about 100° C. and pumped into a tube fitted with an agitator which was rapidly rotated while the tube was cooled with water at a temperature of about 65° C. The residue passed through the tube in about 6 seconds (200 lbs./hr.) wherein about 70% of its latent heat of crystallization was removed and was extruded as a semisolid at a temperature of 90° C. onto a stainless steel conveyor belt cooled to about 10° C. In about ten seconds the semisolid mass had become a frangible, hard, dry solid which could be easily broken up in a grinding mill. It had a set point of about 86° C.

EXAMPLE II

The product of Example I above was readily handled with the conventional rubber compounding ingredients on a rubber mill to form a rubbery composition which was cured and tested. A control without any antioxidant was also prepared for comparative data. The components of the rubbery composition and the results obtained on test are shown below:

*Compositions of rubbers*

| Components | (A) Parts by Weight with Solid Antioxidant | (B) Parts by Weight without Antioxidant |
| --- | --- | --- |
| Pale crepe | 100 | 100 |
| Stearic acid | 2 | 2 |
| Zinc oxide | 5 | 5 |
| TiO₂ | 50 | 50 |
| Sulfur | 2.75 | 2.75 |
| Benzothiazyl Disulfide | 1 | 1 |
| Tetramethyl Thiuram Disulfide | 0.1 | 0.1 |
| Antioxidant | 1 | |

*Tensile properties of rubber compositions*

[Modulus 300% (M)—tensile (T)—percent elongation (E)—hardness (H).]

| Press Cures at 290° F. | (A) | | | | (B) | | | |
| --- | --- | --- | --- | --- | --- | --- | --- | --- |
| | M | T | E | H | M | T | E | H |
| 5 min | (¹) | (¹) | (¹) | (¹) | (¹) | (¹) | (¹) | (¹) |
| 10 min | 520 | 3,680 | 650 | 45 | 540 | 3,680 | 650 | 45 |
| 15 min | 580 | 3,640 | 640 | 47 | 560 | 3,400 | 610 | 47 |
| 20 min | 560 | 3,360 | 620 | 47 | 600 | 3,140 | 610 | 47 |
| 30 min | 500 | 3,480 | 640 | 46 | 580 | 3,280 | 630 | 46 |

¹ Uncured.

AFTER 4 DAYS IN OXYGEN BOMB AT 80° C.

| Press Cures at 290° F. | (A) | | | | (B) | | | |
| --- | --- | --- | --- | --- | --- | --- | --- | --- |
| | M | T | E | H | M | T | E | H |
| 5 min | | | | | | | | |
| 10 min | 820 | 3,020 | 520 | 46 | 580 | 1,480 | 470 | 40 |
| 15 min | 980 | 2,680 | 470 | 49 | 560 | 680 | 360 | 40 |
| 20 min | 960 | 2,340 | 450 | 48 | (¹) | (¹) | (¹) | (¹) |
| 30 min | 800 | 2,260 | 480 | 45 | (¹) | (¹) | (¹) | (¹) |

¹ Melted in O. B.

AFTER 7 DAYS IN OXYGEN BOMB AT 80° C.

| Press Cures at 290° F. | (A) | | | | (B) | | | |
| --- | --- | --- | --- | --- | --- | --- | --- | --- |
| | M | T | E | H | M | T | E | H |
| 5 min | | | | | | | | |
| 10 min | 760 | 2,420 | 480 | 45 | (¹) | (¹) | (¹) | (¹) |
| 15 min | 940 | 1,360 | 350 | 49 | (¹) | (¹) | (¹) | (¹) |
| 20 min | 900 | 1,600 | 390 | 47 | | | | |
| 30 min | 780 | 1,540 | 440 | 44 | | | | |

¹ Melted in oxygen bomb.

*Standing of enamels after 24 hrs. in fadeometer at 100° C.*

| 15 and 20 Min. Cures | (A) | (B) |
| --- | --- | --- |
| Dulux Low Bake Panel | 3 | 3 |
| Dulux Baked 30'/300 | 1 | 1 |

The above examples show that a dialkylated diarylamine composition can readily be solidified and then employed in compounding rubber to which it will afford antioxidant properties as well as non-staining properties.

In summary, the present invention teaches that solid, frangible, dry antioxidants comprising a dialkylated diarylamine can readily be prepared from the alkene-diarylamine reaction mixture by removing the unreacted materials, catalysts and the like and a substantial portion of the monoalkylated diarylamine and then cooling with agitation the resulting liquid residue mixture to about its set point until a semisolid is obtained and then rapidly cooling well below its set point. The solid product is easily crushed and can be readily handled on rubber mills by compounders.

Having thus described the invention what is claimed as new and novel and is desired to be secured by U. S. Letters Patent is:

1. The method which comprises agitating a liquid composition comprising essentially from 80 to 98% by weight of p,p'-di-1,1,3,3-tetramethyl butyl diphenylamine and the balance p-1,1,3,3-tetramethyl butyl diphenylamine while cooling to a temperature of from about 85 to 100° C. to provide a semisolid mass and then rapidly cooling said mass to a temperature substantially below the initial crystallization point temperature of the composition to provide a solid, frangible, dry composition having a set point of at least about 80° C.

2. The method which comprises agitating a liquid composition comprising essentially from 90 to 98% by weight of p,p'-di-1,1,3,3-tetramethyl butyl diphenylamine and the balance p-1,1,3,3-tetramethyl butyl diphenylamine while cooling to a temperature of from about 85 to 100° C. to provide a semisolid mass and then rapidly cooling said mass to a temperature substantially below the initial crystallization point temperature of the composition to provide a solid, frangible, dry composition having a set point of at least about 85° C.

3. The method which comprises agitating a liquid composition comprising essentially about 95% by weight of p,p'-di-1,1,3,3-tetramethyl butyl diphenylamine and the balance p-1,1,3,3-tetramethyl butyl diphenylamine while cooling to a temperature of from about 85 to 100° C. to remove about 70% of the latent heat of crystallization and provide a semisolid mass and then immediately bringing said mass without agitation into heat exchange relationship with cooling means at a temperature of from about 10 to 20° C. to remove the balance of the latent heat of crystallization to provide a solid, frangible, dry composition having a set point of about 86° C.

4. The method which comprises agitating in a first zone a liquid composition consisting essentially of a major amount of p,p'-di-1,1,3,3-tetramethyl butyl diphenylamine and a minor amount of p-1,1,3,3-tetramethyl butyl diphenylamine while cooling said liquid composition to a temperature within the range of the initial crystallization point temperature of said liquid composition to the set point temperature of said dialkylated diphenylamine to obtain a semisolid composition, delivering said semisolid composition to a second zone, and then without agitation in said second zone rapidly cooling said semisolid composition below the initial crystallization point temperature of the liquid composition to provide a solid, frangible, dry composition.

5. The method which comprises delivering to a first zone a liquid mixture consisting essentially of from 80 to 98% by weight of p,p'-di-1,1,3,3-tetramethyl butyl diphenylamine and from 20 to 2% by weight of p-1,1,3,3-tetramethyl butyl diphenylamine, rapidly passing said liquid mixture through said first zone, agitating said liquid mixture and cooling the same while passing said mixture through said first zone to withdraw from about 55 to 80% of the latent heat of crystallization from said liquid mixture and thereby to form a semisolid mixture, delivering said semisolid mixture to a second zone, and rapidly cooling said semisolid mixture in said second zone substantially below the initial crystallization point temperature of said liquid mixture to remove the balance of the latent heat of crystallization and to provide a solid, frangible, dry mixture having a set point of at least about 80° C.

6. The method which comprises continuously delivering to a first zone a liquid composition consisting essentially of from 90 to 98% by weight of p,p'-di-1,1,3,3-tetramethyl butyl diphenylamine and from 10 to 2% by weight of p-1,1,3,3-tetramethyl butyl diphenylamine, pumping said mixture rapidly through said first zone, vigorously agitating said mixture and removing heat from said mixture by cooling the same while passing the same through said first zone until from about 55 to 80% of the latent heat of crystallization of said mixture has been withdrawn to form a semisolid mass, delivering said semisolid mass to a second zone and rapidly cooling said mass in said second zone substantially below the initial crystallization point of said liquid composition without agitation to provide a solid, frangible, dry mixture having a set point within from about 3 to 20% of the set point of the pure p,p'-di-1,1,3,3-tetramethyl butyl diphenylamine.

7. The method which comprises continuously pumping a liquid composition having a temperature of about 100° C. and comprising essentially about 5% by weight of p-1,1,3,3-tetramethyl butyl diphenylamine and the balance p,p'-di-1,1,3,3-tetramethyl butyl diphenylamine through a first zone which contains a rapidly rotating agitator in contact with said composition and which is in heat exchange relationship with a coolant at about 65° C. and at a rate of about 200 lbs./hr. to remove about 70% of the latent heat of crystallization of said liquid composition, extruding said composition as a semisolid mass having a temperature of 90° C. from said first zone onto conveying means having a temperature of about 10° C. to remove the balance of the latent heat of crystallization from said composition and to provide a frangible, hard, dry solid having a set point of about 86° C.

References Cited in the file of this patent

UNITED STATES PATENTS

| 2,009,480 | Craig | July 30, 1935 |
| 2,530,769 | Hollis | Nov. 21, 1950 |